May 1, 1928.                                                          1,668,497
                              L. E. FISHBACK
           LUBRICATING SYSTEM FOR TRAVELING BLOCKS INCLUDING SHEAVES
                          Filed March 5, 1926           2 Sheets-Sheet 1
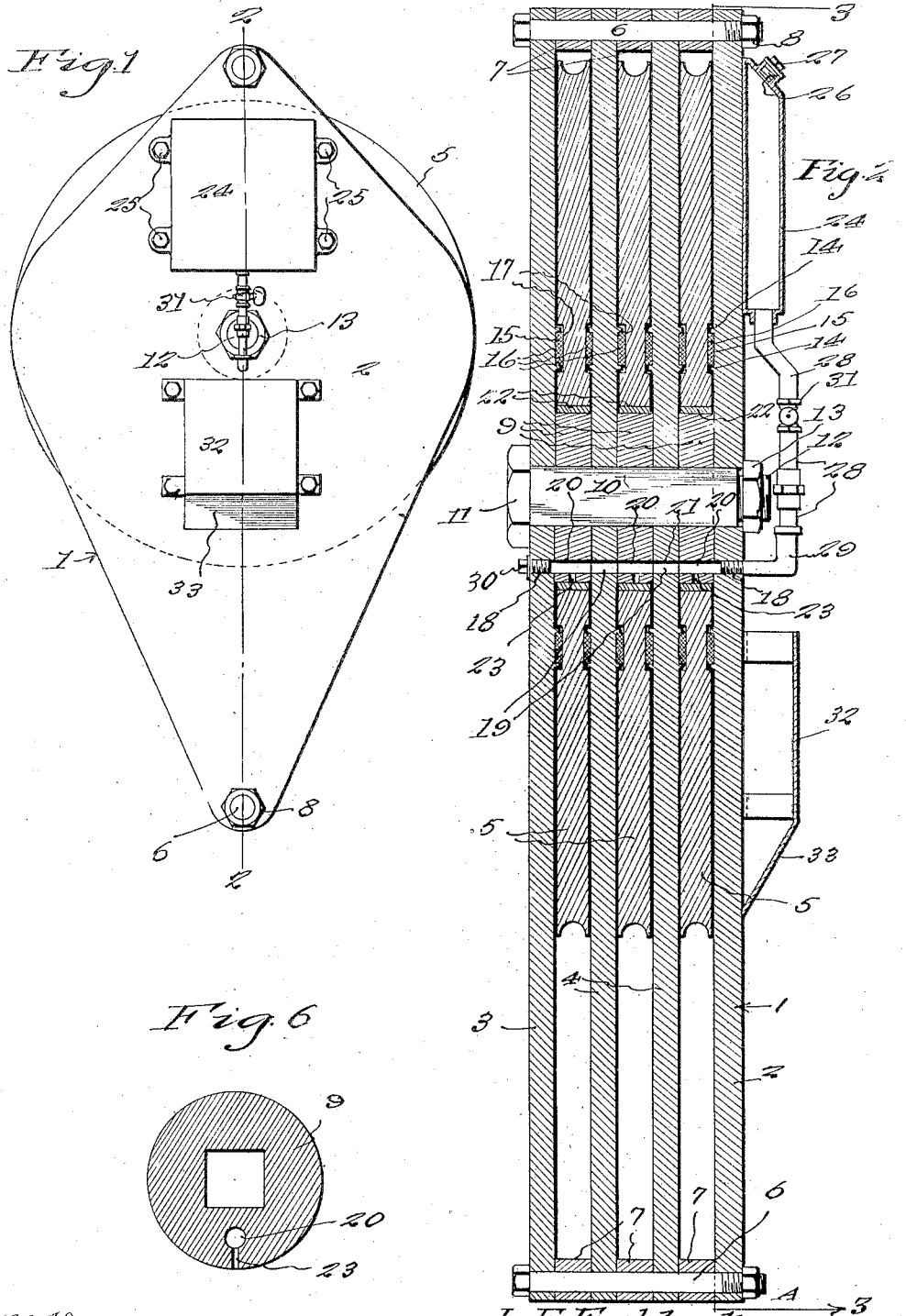

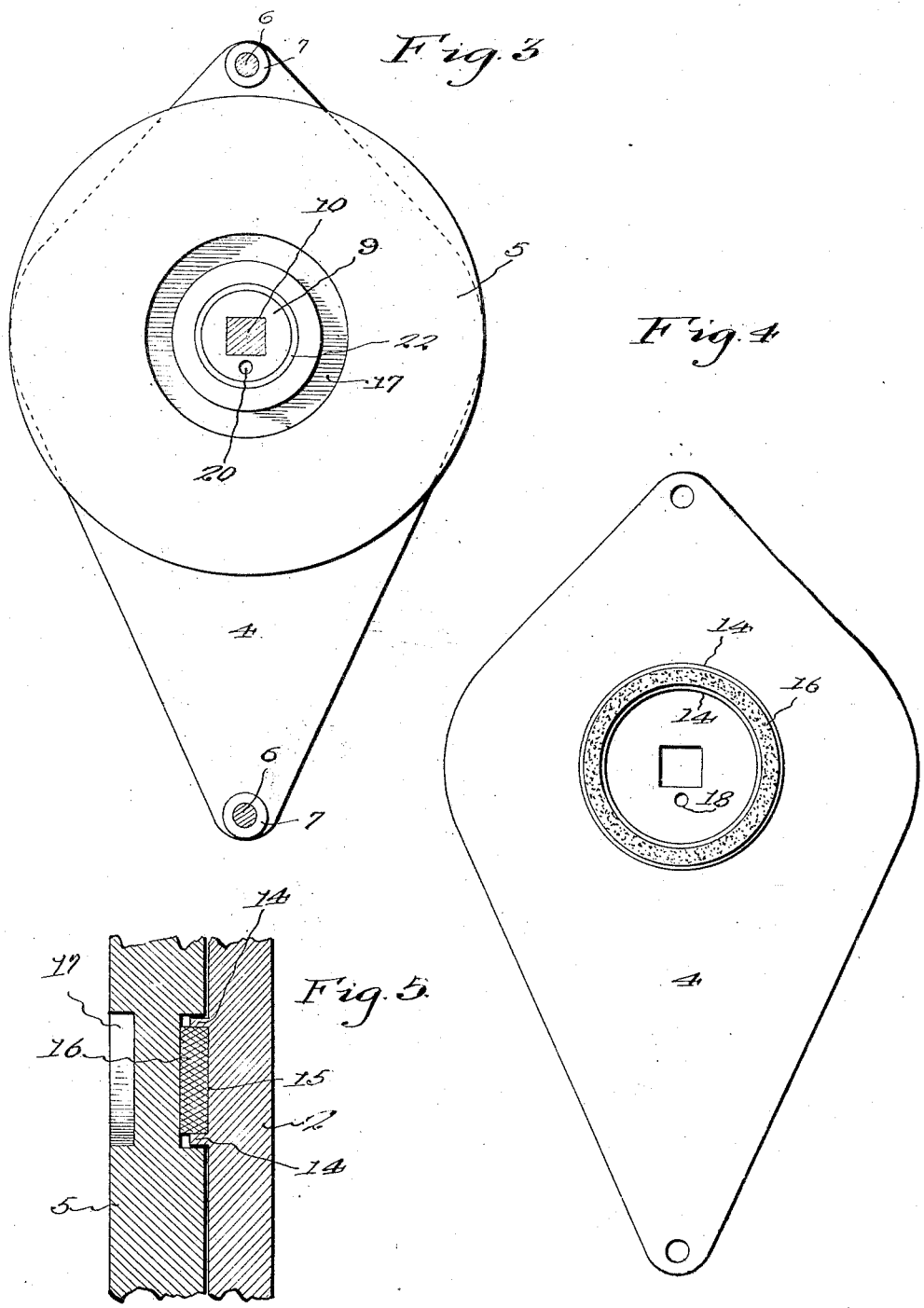

Patented May 1, 1928.

1,668,497

UNITED STATES PATENT OFFICE.

LLOYD E. FISHBACK, OF EL DORADO, ARKANSAS.

LUBRICATING SYSTEM FOR TRAVELING BLOCKS INCLUDING SHEAVES.

Application filed March 5, 1926. Serial No. 92,597.

It is the purpose of the present invention to provide, in a lubricating system for sheaves of a traveling block (which is used in connection with oil well drilling rigs), a traveling block shell or frame including spacers, for spacing the sheaves or pulleys, in conjunction with suitable packing interposed between the spacers and the sheaves, to retain the lubricant in close proximity to the bearing bushings of the journal of the traveling block, thereby preventing the lubricant from reaching the peripheral grooves of the sheaves, as well as preventing the lubricant from congealing or clogging between the walls of the sheaves and the spacers.

Another purpose is to provide a reservoir for the reception of a lubricant in conjunction with a feed tube or conduit for feeding the lubricant to the inner surfaces of the bushings.

Still another purpose is the provision of a hub comprising a plurality of hub members interposed between the spacers, and a holding pin or bolt passing through the members and through the spacers, to hold the spacers relatively positioned to permit the sheaves or pulleys to freely rotate, on bushings carried by the respective hub members.

It is to be understood that the particulars herein given are in no way limitive and that while still keeping within the scope of the invention, any desired modifications of detail and desired proportions may be made in the apparatus according to circumstances.

The invention comprises further features and the combination of parts, as will be hereinafter set forth, shown in the drawings, and claimed.

In the drawings:

Figure 1 is a view in side elevation of the improved traveling block, showing the application of the lubricating system.

Figure 2 is a vertical sectional view on line 2—2 of Figure 1.

Figure 3 is a sectional view on line 3—3 of Figure 2 taken in the direction of the arrow A, showing the groove in one of the sheaves which operatively receives a packing (not shown in Figure 3).

Figure 4 is a face view of one of the outer spacers, showing the circular groove, in which a packing fits, and which packing in turn operates in a groove of a sheave.

Figure 5 is an enlarged detail view of a portion of one of the outer spacers and an adjoining sheave or pulley, showing the position of the packing.

Figure 6 is a detail view of one of the hub members, showing an opening therein, which with similar openings of the other hub members and the spacers constitute a duct for feeding the lubricant to the radial openings of the hub members.

Referring to the drawings, 1 designates the traveling block as a whole which comprises two outer spacers 2 and 3, and two inner spacers 4. Intermediate the spacers are sheaves or pulleys 5, which are partly spaced by the intermediate spacers 4.

The spacers in elevation as shown in Figure 1 may be any suitable shape, preferably tapered toward their opposite ends, though not necessarily, and passing through the extremities of the spacers are bolts 6, there being suitable washers 7 on the bolts and intermediate the spacers. The bolts 6 have nuts 8 to clamp the parts together.

Intermediate the spacers are hub members 9, which are thicker than the sheaves 5, so that the sheaves in rotating will not unduly contact with the adjacent faces of the spacers. The hub members are the same in thickness as the thickness of the washers 7, so that the several spacers may be held spaced apart a distance sufficient to permit the sheaves to properly operate.

In order to hold the hub members and the spacers securely together centrally, a bolt or pin 10 passes through the centers of the hub members, and through the spacers. The openings in the hub members and the spacers are rectangular or square in cross section, while the bolt is correspondingly constructed, thereby preventing the bolt from turning. One end of the bolt has an integral head 11, and its other end has a reduced extension 12 which is threaded, receiving a nut 13, which may be sufficiently tightened to hold the several parts secure and against derangement.

The adjacent faces of the spacers have relatively spaced annular ribs 14, which are so positioned as to cause annular grooves 15 to be formed. These grooves receive packing rings 16, which may be constructed of any suitable material, preferably soft felt, thick enough to hold the sheaves relatively spaced between the spacers. These packing rings tend toward holding the sheaves spaced from the spacers and reducing the contact of the sheaves with the spacers to a minimum. The opposite faces of the several sheaves have annular grooves 17 which operatively receive the packing rings.

The remote outside spacers or plates are provided with openings 18 which are threaded, while the intermediate spacers 4 have similar openings 19. The hub members are provided with openings 20. When the several parts consisting of the spacers and the hub members are arranged as in Figure 2 and clamped tightly together by the bolt 10, the several openings 18, 19 and 20 register, thereby causing an oil duct 21 to be formed.

Encircling the marginal peripheries of the hub members 9 and movable thereabout are bushings 22 constructed of any suitable metal, preferably bronze. These bushings 22 are fastened in any suitable manner in the sheaves, preferably by friction as a result of shrinking the bushings in the sheaves. therefore the bushings move with the sheaves and rotate around the hub members 9.

It is the purpose to lubricate the interior surfaces of these bushings 22, therefore each of the hub members 9 at a point directly under the bolt 10 is provided with radial openings or passages 23 communicating with the oil duct formed by the several openings 19 and 20.

A suitable lubricant reservoir or container 24 is bolted at 25 to the upper portion of the exterior face of the spacer or outside plate 2, and is provided with a filling opening 26 to permit the reservoir or tank to be supplied with the necessary lubricant. A suitable plug 27 closes this filling opening, after the reservoir is filled.

A tubular conduit is connected to the reservoir or tank 24 and extends therefrom and has its other end threaded to fasten into the opening 18 of the plate 2. This tubular conduit consists of the several fittings 28 and the elbow 29. A suitable plug 30 engages the interior threads of the opening 18 formed in the plate 3, and as the conduit connects the tank or reservoir with the duct, the oil or lubricant may be controlled in its passage, by means of a suitable valve 31 which is included in the tubular conduit. This valve may be set so that the necessary supply of lubricant may reach the duct formed by the several openings 19 and 20, and as the hub members have radial passages or openings, this lubricant or oil may easily feed to the inner surfaces of the bushings, thus allowing the several sheaves to freely and properly operate, and by provision of the circular packings between the sheaves and the spacers prevent the lubricant from feeding beyond the packings and eventually reach the outer marginal grooves of the sheaves.

It will be noted that at the upper end of the tank or reservoir, the corner thereof is beveled off, in order to prevent the upper portion of the reservoir from contacting with any object that might be in the path of the traveling block.

The reservoir acts to guard the conduit leading from the reservoir to the duct through the several hub members in the travel of the block upward. Secured to the outer face of the plate or spacer 2 at a point below the conduit is a sheet metal guard 32, which acts to protect the piping or conduit which connects the reservoir and said duct, during the travel of the block downwardly. It will be noted that the lower portion of the guard 32 is beveled oil as at 33, in order to easily pass any object that might be in the path of travel.

The invention having been set forth, what is claimed is:—

In a traveling block, the combination with a frame, consisting of a plurality of spacers, a plurality of sheaves between said spacers and a hub for connecting said spacers and for rotatably supporting said sheaves, an oil channel extending transversely through said hub and ducts leading from said hub to the inner peripheries of said sheaves, means for preventing the escape of oil between said sheaves and spacers, consisting of annular depressions formed in said sheaves, spaced annular ridges on said spacers forming an annular groove therebetween, said ridges projecting into the depressions of said sheaves and packing rings held between said ridges and fitting against the bottoms of said annular grooves and means for feeding oil to the channel in said hub.

In testimony whereof I affix my signature.

LLOYD E. FISHBACK.